United States Patent
Cote et al.

(10) Patent No.: US 9,061,250 B2
(45) Date of Patent: Jun. 23, 2015

(54) NON-BRAIDED, TEXTILE-REINFORCED HOLLOW FIBER MEMBRANE

(75) Inventors: Pierre Lucien Cote, Ontario (CA); Steven Kristian Pedersen, Burlington (CA)

(73) Assignee: BL Technologies, Inc., Trevose, PA (US)

( * ) Notice: Subject to any disclaimer, the term of this patent is extended or adjusted under 35 U.S.C. 154(b) by 533 days.

(21) Appl. No.: 13/380,393

(22) PCT Filed: Jun. 25, 2010

(86) PCT No.: PCT/CA2010/000993
§ 371 (c)(1),
(2), (4) Date: Dec. 22, 2011

(87) PCT Pub. No.: WO2010/148517
PCT Pub. Date: Dec. 29, 2010

(65) Prior Publication Data
US 2012/0097604 A1    Apr. 26, 2012

Related U.S. Application Data

(60) Provisional application No. 61/220,797, filed on Jun. 26, 2009.

(51) Int. Cl.
*B01D 39/00* (2006.01)
*B01D 39/14* (2006.01)
(Continued)

(52) U.S. Cl.
CPC .............. *B01D 69/02* (2013.01); *B01D 69/08* (2013.01); *B01D 69/087* (2013.01); *B01D 2323/42* (2013.01); *B01D 2325/40* (2013.01); *B01D 69/085* (2013.01); *B01D 2323/39* (2013.01)

(58) Field of Classification Search
CPC .......... B01D 69/00; B29C 63/04; B29D 23/00
USPC ........ 210/500.23; 264/178 R, 177.14; 442/60, 442/269, 366; 118/75
See application file for complete search history.

(56) References Cited

U.S. PATENT DOCUMENTS

| | | |
|---|---|---|
| 2,936,482 A | 5/1960 | Kilian |
| 3,494,121 A | 2/1970 | Bohrer |

(Continued)

FOREIGN PATENT DOCUMENTS

| | | |
|---|---|---|
| CA | 986422 A1 | 3/1976 |
| CA | 2288316 A1 | 5/2000 |

(Continued)

OTHER PUBLICATIONS

Caplan et al., Formation of microporous Teflon PFA membranes via thermally induced phase separation, Journal of Membrane Science, 130 (1997) p. 219-237.

(Continued)

*Primary Examiner* — Ana Fortuna
(74) *Attorney, Agent, or Firm* — GE Global Patent Operation

(57) ABSTRACT

Various methods of making a reinforced membrane, devices for making the membranes, and the resulting membranes are described. The methods typically provide a reinforcing structure that includes filaments extending around the circumference of the membrane but without the filaments being part of a braided or woven structure. Some of the reinforcing structures also include longitudinal filaments. The methods and devices can be used to make a supporting structure in line with membrane formation steps, and also allow for a reinforced membrane to be produced that has a ratio of inside-to-outside diameters of 0.5 or more.

27 Claims, 11 Drawing Sheets

(51) Int. Cl.
  *B29C 47/00* (2006.01)
  *B29C 47/12* (2006.01)
  *B29C 47/88* (2006.01)
  *D01D 5/08* (2006.01)
  *B01D 69/02* (2006.01)
  *B01D 69/08* (2006.01)

(56) References Cited

U.S. PATENT DOCUMENTS

| | | | |
|---|---|---|---|
| 3,547,721 A | 12/1970 | Dietzsch | |
| 3,567,666 A | 3/1971 | Berger | |
| 3,615,024 A | 10/1971 | Michaels | |
| 3,676,193 A | 7/1972 | Cooper et al. | |
| 3,705,070 A * | 12/1972 | Kim | 428/112 |
| 3,745,142 A | 7/1973 | Mahlman | |
| 3,816,231 A * | 6/1974 | Marshall | 442/366 |
| 3,849,241 A | 11/1974 | Butin et al. | |
| 3,948,781 A | 4/1976 | Brun et al. | |
| 3,984,328 A | 10/1976 | Brun et al. | |
| 4,020,230 A | 4/1977 | Mahoney et al. | |
| 4,061,821 A | 12/1977 | Hayano et al. | |
| 4,115,492 A | 9/1978 | Mahoney et al. | |
| 4,194,942 A | 3/1980 | Tanaka | |
| 4,247,498 A | 1/1981 | Castro | |
| 4,253,936 A | 3/1981 | Leysen et al. | |
| 4,299,083 A | 11/1981 | Igel et al. | |
| 4,335,193 A | 6/1982 | Doi et al. | |
| 4,340,480 A | 7/1982 | Pall et al. | |
| 4,384,047 A | 5/1983 | Benzinger et al. | |
| 4,399,035 A | 8/1983 | Nohmi et al. | |
| 4,405,688 A | 9/1983 | Lowery et al. | |
| 4,406,850 A | 9/1983 | Hills | |
| 4,541,981 A | 9/1985 | Lowery et al. | |
| 4,664,681 A | 5/1987 | Anazawa et al. | |
| 4,666,607 A | 5/1987 | Josefiak et al. | |
| 4,702,836 A | 10/1987 | Mutoh et al. | |
| 4,707,265 A | 11/1987 | Barnes, Jr. et al. | |
| 4,741,829 A | 5/1988 | Takemura et al. | |
| 4,764,320 A | 8/1988 | Chau et al. | |
| 4,919,856 A | 4/1990 | Anazawa et al. | |
| 4,957,943 A | 9/1990 | McAllister et al. | |
| 5,011,588 A | 4/1991 | Rao et al. | |
| 5,013,339 A | 5/1991 | Mahoney et al. | |
| 5,022,990 A | 6/1991 | Doi et al. | |
| 5,066,401 A | 11/1991 | Muller et al. | |
| 5,139,529 A | 8/1992 | Seita et al. | |
| 5,151,191 A | 9/1992 | Sunaoka et al. | |
| 5,168,005 A | 12/1992 | Keating et al. | |
| 5,171,493 A | 12/1992 | Aptel et al. | |
| 5,209,852 A | 5/1993 | Sunaoka et al. | |
| 5,232,597 A | 8/1993 | Eguchi | |
| 5,232,642 A | 8/1993 | Kamo et al. | |
| 5,238,562 A | 8/1993 | Rogut | |
| 5,240,610 A | 8/1993 | Tani et al. | |
| 5,271,883 A | 12/1993 | Timmons et al. | |
| 5,284,583 A | 2/1994 | Rogut | |
| 5,294,338 A | 3/1994 | Kamo et al. | |
| 5,303,550 A | 4/1994 | Setzer | |
| 5,328,610 A | 7/1994 | Rogut | |
| 5,332,498 A | 7/1994 | Rogut | |
| 5,336,298 A | 8/1994 | Quinn et al. | |
| 5,374,453 A | 12/1994 | Swei et al. | |
| 5,376,273 A | 12/1994 | Pacheco et al. | |
| 5,385,777 A | 1/1995 | Higuchi et al. | |
| 5,392,588 A * | 2/1995 | Morrison | 57/328 |
| 5,435,955 A | 7/1995 | Kamei et al. | |
| 5,470,659 A | 11/1995 | Baumgart et al. | |
| 5,472,607 A | 12/1995 | Mailvaganam et al. | |
| 5,474,680 A | 12/1995 | Eguchi | |
| 5,489,406 A | 2/1996 | Beck et al. | |
| 5,497,608 A | 3/1996 | Matsumoto et al. | |
| 5,547,756 A | 8/1996 | Kamo et al. | |
| 5,637,385 A | 6/1997 | Mizuki et al. | |
| 5,656,167 A | 8/1997 | Martz | |
| 5,709,735 A | 1/1998 | Midkiff et al. | |
| 5,716,689 A | 2/1998 | Rogut | |
| 5,753,351 A | 5/1998 | Yoshida et al. | |
| 5,782,959 A | 7/1998 | Yang et al. | |
| 5,783,608 A | 7/1998 | Sugo et al. | |
| 5,804,128 A | 9/1998 | Ogata et al. | |
| 5,882,461 A | 3/1999 | Rogut | |
| 5,888,605 A | 3/1999 | Hachisuka et al. | |
| 5,914,039 A | 6/1999 | Mahendran et al. | |
| 5,972,501 A | 10/1999 | Ohmory et al. | |
| 6,015,495 A | 1/2000 | Koo et al. | |
| 6,024,872 A | 2/2000 | Mahendran et al. | |
| 6,048,641 A | 4/2000 | Ohmory et al. | |
| 6,077,376 A * | 6/2000 | Katraro et al. | 156/195 |
| 6,083,393 A | 7/2000 | Wu et al. | |
| 6,090,731 A | 7/2000 | Pike et al. | |
| 6,114,017 A | 9/2000 | Fabbricante et al. | |
| 6,127,433 A | 10/2000 | Sugo et al. | |
| 6,183,640 B1 | 2/2001 | Wang | |
| 6,245,239 B1 | 6/2001 | Cote et al. | |
| 6,264,044 B1 | 7/2001 | Meyering et al. | |
| 6,273,271 B1 | 8/2001 | Moya | |
| 6,280,791 B1 | 8/2001 | Meyering et al. | |
| 6,354,443 B1 | 3/2002 | Moya | |
| 6,354,444 B1 | 3/2002 | Mahendran et al. | |
| 6,454,943 B1 | 9/2002 | Koenhen | |
| 6,465,094 B1 | 10/2002 | Dugan | |
| 6,495,663 B1 | 12/2002 | Rothbard et al. | |
| 6,559,192 B2 | 5/2003 | Maccone et al. | |
| 6,635,204 B2 | 10/2003 | Tanaka et al. | |
| 6,746,627 B2 | 6/2004 | Niu et al. | |
| 6,792,744 B2 | 9/2004 | Feuerlohn et al. | |
| 6,802,971 B2 | 10/2004 | Gorsuch et al. | |
| 6,890,435 B2 | 5/2005 | Ji et al. | |
| RE39,176 E * | 7/2006 | Dutt | 442/43 |
| 7,081,273 B2 | 7/2006 | Ji | |
| 7,165,682 B1 | 1/2007 | Ji | |
| 7,172,075 B1 | 2/2007 | Ji | |
| 7,247,238 B2 | 7/2007 | Mullette et al. | |
| 7,267,872 B2 | 9/2007 | Lee et al. | |
| 7,306,105 B2 | 12/2007 | Shinada et al. | |
| 7,413,804 B2 | 8/2008 | Lee et al. | |
| 7,563,376 B2 | 7/2009 | Oishi | |
| 8,393,479 B2 | 3/2013 | Kamleiter et al. | |
| 8,529,814 B2 * | 9/2013 | Palinkas et al. | 264/177.14 |
| 2002/0046970 A1* | 4/2002 | Murase et al. | 210/483 |
| 2002/0090690 A1 | 7/2002 | Eddleman et al. | |
| 2002/0155289 A1 | 10/2002 | Cistone et al. | |
| 2003/0094409 A1 | 5/2003 | Minegishi et al. | |
| 2003/0107150 A1 | 6/2003 | Hamanaka et al. | |
| 2003/0192826 A1 | 10/2003 | Wang et al. | |
| 2004/0078903 A1 | 4/2004 | Bruning et al. | |
| 2004/0136891 A1 | 7/2004 | Kijima et al. | |
| 2005/0205488 A1 | 9/2005 | Shinada et al. | |
| 2006/0175243 A1 | 8/2006 | Mahendran et al. | |
| 2007/0262017 A1 | 11/2007 | Shinada et al. | |
| 2008/0210623 A1 | 9/2008 | McMahon et al. | |
| 2008/0241451 A1 | 10/2008 | Beckers et al. | |
| 2009/0314708 A1* | 12/2009 | Yeom | 210/500.23 |
| 2012/0018371 A1* | 1/2012 | Cote | 210/500.23 |
| 2012/0097604 A1* | 4/2012 | Cote et al. | 210/500.23 |
| 2013/0153490 A1* | 6/2013 | Pedersen et al. | 210/500.23 |
| 2013/0158007 A1* | 6/2013 | Mickle et al. | 514/211.13 |
| 2013/0233788 A1* | 9/2013 | Vizvardi et al. | 210/490 |

FOREIGN PATENT DOCUMENTS

| | | |
|---|---|---|
| CA | 2474625 A1 | 8/2003 |
| CA | 2478445 A1 | 9/2003 |
| CA | 2478831 A1 | 9/2003 |
| CA | 2630418 A1 | 6/2007 |
| CH | 507012 A | 5/1971 |
| DE | 4142417 A1 | 6/1992 |
| DE | 10211051 A1 | 10/2003 |
| DE | 10358477 B3 | 4/2005 |
| EP | 160483 A2 | 11/1985 |
| EP | 0241995 A1 | 10/1987 |
| EP | 0761292 A1 | 3/1997 |
| EP | 0819467 A2 | 1/1998 |

(56) References Cited

FOREIGN PATENT DOCUMENTS

| | | |
|---|---|---|
| EP | 0998972 A1 | 5/2000 |
| EP | 1193292 A2 | 4/2002 |
| EP | 1236503 A1 | 9/2002 |
| EP | 1658889 A1 | 5/2006 |
| EP | 0998972 B1 | 4/2007 |
| FR | 2616812 A1 | 12/1988 |
| GB | 1325672 * | 8/1973 |
| GB | 1374704 A | 11/1974 |
| GB | 2041821 A | 9/1980 |
| JP | 44003876 B | 2/1969 |
| JP | 53-039982 A | 9/1974 |
| JP | 52082682 A | 7/1977 |
| JP | 52137026 A | 11/1977 |
| JP | 53028084 A | 3/1978 |
| JP | 5456660 A | 5/1979 |
| JP | 55137209 A | 10/1980 |
| JP | 57005914 A | 1/1982 |
| JP | 57-028139 A | 2/1982 |
| JP | 58-004810 A | 1/1983 |
| JP | 58-049408 A | 3/1983 |
| JP | 58-093734 A | 6/1983 |
| JP | 59196706 A | 11/1984 |
| JP | 60137402 A | 7/1985 |
| JP | 60139815 A | 7/1985 |
| JP | 61-146811 A | 7/1986 |
| JP | 61204613 U | 12/1986 |
| JP | 62001404 A | 1/1987 |
| JP | 62019206 A | 1/1987 |
| JP | 62045318 A | 2/1987 |
| JP | 62079806 A | 4/1987 |
| JP | 62-133190 A | 6/1987 |
| JP | 64-014315 A | 1/1989 |
| JP | 2107318 A | 4/1990 |
| JP | 2268816 A | 11/1990 |
| JP | 04-265132 A | 9/1992 |
| JP | 4265133 A | 9/1992 |
| JP | 4293529 A | 10/1992 |
| JP | 5301031 A | 11/1993 |
| JP | 06-015152 A | 1/1994 |
| JP | 06-246139 A | 9/1994 |
| JP | 6246140 A | 9/1994 |
| JP | 07-080263 A | 3/1995 |
| JP | 07-116483 A | 5/1995 |
| JP | 7157580 A | 6/1995 |
| JP | 8165396 A | 6/1996 |
| JP | 10-323546 A | 12/1998 |
| JP | 11-319519 A | 11/1999 |
| JP | 2000-093768 A | 4/2000 |
| JP | 2000288365 A | 10/2000 |
| JP | 2001-062258 A | 3/2001 |
| JP | 2007513755 A | 5/2007 |
| JP | 2008-114180 A | 5/2008 |
| JP | 2008105014 A | 5/2008 |
| JP | 2008126199 A | 6/2008 |
| NL | 1010458 C2 | 4/2000 |
| WO | WO 93/23153 A1 | 11/1993 |
| WO | WO 99/01207 A1 | 1/1999 |
| WO | WO 00/78437 A1 | 12/2000 |
| WO | WO 02/34373 A1 | 5/2002 |
| WO | WO 03/059496 A2 | 7/2003 |
| WO | WO 03/068374 A1 | 8/2003 |
| WO | WO 03/076055 A1 | 9/2003 |
| WO | WO 03/076056 A1 | 9/2003 |
| WO | WO 03/097221 A1 | 11/2003 |
| WO | WO 2004/009221 A1 | 1/2004 |
| WO | WO 2004/089520 A1 | 10/2004 |
| WO | WO 2005/002712 A1 | 1/2005 |
| WO | WO 2006053406 A1 | 5/2006 |
| WO | WO 2006063426 A1 | 6/2006 |
| WO | WO 2007116072 A2 | 10/2007 |
| WO | WO 2008066340 A1 | 6/2008 |
| WO | WO 2010/081228 A1 | 7/2010 |
| WO | WO 2010/108285 A1 | 9/2010 |
| WO | WO 2010/148517 A1 | 12/2010 |

OTHER PUBLICATIONS

Choi et al., Fabrication and characterization of multi-walled carbon nanotube/polymer blend membranes, Journal of Membrane Science 284 (2006) p. 406-415.

Choi et al., Modification of Performances of Various Memranes Using MWNTs as a Modifier, Macromol. Symp. 2007, 249-250, p. 610-617.

Lin et al., Microporous PVDF membrane formation by immersion precipitation from water/TEP/PVDF system, Desalination, 145 (2002) p. 25-29.

Lloyd, Douglas R., Microporous membrane formation via thermally induced phase separation, I. Solid-liquid phase separation, Journal of Membrane Science, 52 (1990) p. 239-261.

Lloyd et al., Microporous membrane formation via thermally-induced phase separation. II. Liquid-liquid phase separation, Journal of Membrane Science, 64 (1991) p. 1-11.

Ramaswamy et al., Fabication of poly (ECTFE) membranes via thermally induced phase separation, Journal of Membrane Science, 210 (2002) p. 175-180.

International Search Report and Written Opinion from corresponding Application No. PCT/CA2010/000469, dated Jun. 14, 2010.

International Search Report and Written Opinion from corresponding Application No. PCT/CA2010/000993, dated Oct. 6, 2010.

Search Report and Written Opinion from corresponding EP Application No. 10791125.7-1356 dated Oct. 7, 2013.

Unofficial English Translation of Japanese Office Action issued in connection with corresponding JP Application No. 2012-516455 on Jun. 17, 2014.

* cited by examiner

NON-BRAIDED, TEXTILE-REINFORCED HOLLOW FIBER MEMBRANE

For the United States of America, this application claims the benefit under 35 USC §119(e) of U.S. Provisional Application No. 61/220,797 filed on Jun. 26, 2009. U.S. Provisional Application No. 61/220,797 is incorporated herein in its entirety by this reference to it.

FIELD

This specification relates to reinforced hollow fiber membranes, to reinforcement structures for hollow fiber membranes, and to methods of making hollow fiber membranes and reinforcement structures for them.

BACKGROUND

The following is not an admission that anything discussed below is citable as prior art or part of the common general knowledge.

Polymeric separation membranes in the form of small capillary tubes or hollow fibers can be made from a variety of polymers by different methods including NIPS (non-solvent induced phase separation) and TIPS (thermally induced phase separation). Examples of NIPS processes are described in U.S. Pat. Nos. 3,615,024, 5,066,401 and 6,024,872. Examples of TIPS processes are described in U.S. Pat. Nos. 4,702,836 and 7,247,238. The membranes may have a separation layer on the inside or outside and may be used, for example, for microfiltration (MF) or ultrafiltration (UF).

A benefit of membranes in water treatment is their ability to remove bacteria from water, effectively providing physical disinfection. However, it is important to maintain mechanical integrity of the membrane for its expected service life. With hollow fiber membrane modules, one mechanical failure mechanism is fiber breakage (often near a potting interface) as a result of fatigue.

International Publication Number WO 03/097221 A1 to Yoon et al. and US Publication Number US 2002/0046970 A1 to Murase et al. describe embedding mono or multi-filament yarns longitudinally within the wall of a hollow fiber membrane as a way of reinforcing the membrane. However, upon flexing and movement of the hollow fiber, the longitudinal filaments are likely to saw through the softer membrane material and thus create a new failure mode. The inventors are not aware of any use of such a membrane in industry.

Another type of reinforced hollow fiber membrane that is currently used in industry uses a hollow textile braided sleeve coated or impregnated with a polymeric membrane. The braid provides the strength that is needed in MF/UF applications such as filtration of water suspensions or mixed liquor where continuous or intermittent agitation (with air or otherwise) of the hollow fibers is used to prevent fouling or accumulation of solids on the membrane surface.

Examples of braid-supported filtration membranes include U.S. Pat. No. 4,061,861 to Hayano et al. where a polymer is impregnated into a hollow braid to prevent shrinkage when operating at high temperature; U.S. Pat. Nos. 5,472,607 and 6,354,444 to Mahendran et al.; U.S. Pat. No. 7,267,872 to Lee et al. where the membrane is coated on the outside surface of the braid and penetration is limited; and, U.S. Pat. No. 7,306,105 to Shinada et al. where the braid is coated with two different porous layers.

Braid-supported hollow fiber membranes are normally prepared as follows. The braid is fabricated on a braider, wound on a bobbin, repackaged to larger spools by splicing ends together, and then transferred to a spin line where it is unwound and then coated or impregnated with a polymer solution in a coating head. Relatively thick walled and tightly woven braids are used so that the braid will be round-stable, meaning that it does not flatten out through winding and unwinding and is still round when inserted into the coating head.

Braided supports thus have some disadvantages. For example, round-stable braids are fabricated on braiding machines with a large number (for example 16 or more) of braiding carriers. Each carrier is supplied from a different bobbin and the bobbins must cross paths in the braiding machine. The bobbins must accelerate, decelerate and reverse radially every time the carriers cross each other. This is a costly and slow operation. Small diameter braids (less than 2 mm) are normally made at a speed of less than 0.5 m/min. In contrast, the braid coating or impregnation operation is typically done much faster, for example at a speed of greater than 15 m/min, thus the need for separate operations with a spool transfer step in between. Unwinding a large spool of braid at constant tension for membrane coating is also challenging, and the coating process must stop from time to time to change spools.

In addition, the braids used for membrane support are typically of a relatively large diameter (>1.5 mm). This is because braiding speed and braid costs are generally diameter independent, but the surface area increases proportionally with diameter. Braids thus normally have a large diameter as well as a thick wall, required to make them round-stable. As a result, the ratio of inside-to-outside diameters is small, typically smaller than 0.5. This is the normalized parameter that determines the pressure loss to conduct permeate through the lumen. High lumen pressure drop in thick wall braids limits the useful length of hollow fibers that can be potted in a module.

Fiber diameter is also a significant hidden contributor to overall membrane cost because the volume of a fiber is proportional to the square of its diameter, while the developed surface area is proportion to diameter directly. Therefore, at constant packing density of hollow fibers in a module and constant ratio of inside-to-outside diameters, an increase in the outside diameter of a fiber decreases specific surface area (area per unit volume) and increases specific polymer use (mass of polymer per unit surface area), both of which increase the cost of a membrane system designed to filter a given flow of water.

INTRODUCTION

The following is intended to introduce the reader to the detailed description to follow and not to limit or define the claims.

In the detailed description, various methods of making a reinforced membrane, devices for making the membranes, and the resulting membranes are described. The methods typically provide a reinforcing structure (sometimes called a "tubular cage" or "cage" herein) that includes filaments extending around the circumference of the membrane but without the filaments being part of a braided or woven structure. Some of the reinforcing structures also include longitudinal filaments. The methods and devices can be used to make a supporting structure in line with membrane formation steps, and also allow for a reinforced membrane to be produced that has a ratio of inside-to-outside diameters of 0.5 or more.

One method of making a reinforced hollow fiber membrane uses composite yarns. The yarns comprise generally continuous longitudinal filaments extending along the length of the yarn and other filaments having loose ends or loops, or both, that protrude from the longitudinal filaments. A reinforcing structure comprising the yarns is formed around the outer surface of a core, such as a mandrel, needle or fiber, with an outside diameter similar to the intended inside diameter or the membrane being made. In the reinforcing structure, the generally continuous longitudinal filaments are spaced around a circumference of the core, and are generally aligned with the length of the core. The ends or loops of the yarns extend around a portion of the circumference of the core and overlap or intersect with one or more filaments of one or more of the other yarns. A liquid membrane dope is applied to the reinforcing structure in a coating head (sometimes called a "spinneret" herein) and then treated to form a solid reinforced membrane. Optionally, the supporting structure may be relatively open compared to a braided support with the membrane dope fully impregnating the yarns. A separation layer may be located on the inside or outside of the membrane.

In the method mentioned above, or in other methods described herein in which a reinforcing structure is made over a core, the core may be fixed or movable. If the core is fixed, yarns or other filaments slide along and eventually off of the core. A fixed core may have an interior bore through which a bore fluid is injected through the coating head to help form the inside surface of the membrane. If the core is movable, the core moves with the yarns or other filaments through the membrane coating head or spinneret. A moving core may comprise a previously formed membrane wall or a soluble core that will be dissolved out of the membrane later.

The reinforcing structure and the membrane wall are preferably formed concurrently, though sequentially. For example, in one method of making a reinforced fiber using a fixed core, composite yarns are pulled along a mandrel and through a membrane coating head. Filaments of the composite yarns may be entangled with each other as the yarns move along the mandrel upstream of the spinneret, for example by a spinning device. A membrane dope flows through the coating head and around the yarns as they pass through the coating head. The filaments and dope leaving the coating head continue to a bath wherein the membrane dope forms a solid membrane wall.

Optionally, the filaments of the reinforcing structure may be bonded to each other at points of contact where they intersect. This may be done in a bonding device upstream of the membrane coating spinneret, for example by applying heat or UV light to the reinforcing structure. Alternatively, the bonding may be done in the membrane dope by way of solvents in the dope softening or solvent bonding the reinforcing filaments. Some or all of the filaments may be composite filaments having a component adapted to the bonding method.

In the coating head, the reinforcing structure passes through an annular passage around the core thus placing the reinforcing structure with the membrane wall. Optionally, the filaments of the reinforcing structure may also be smoothed in a die before they pass through a coating head.

One apparatus for making a hollow fiber membrane described herein comprises a mandrel, a creel at one end of the mandrel to distribute a plurality of yarns around the outer surface of the mandrel, a membrane dope coating head at another end of the mandrel, and an air spinning or vacuum spinning device located around the mandrel between the creel and the mandrel. One hollow fiber membrane described herein comprises a selectively permeable wall, a plurality of yarns attached to the wall and extending along the length of the membrane, and filament ends or loops of the plurality of yarns intersecting filaments of adjacent yarns.

Other methods, devices and membranes are also described herein. For example, some methods of making a reinforced hollow fiber membrane include steps of forming a reinforcing structure around the outside of the core, applying a liquid membrane dope to the reinforcing structure, treating the liquid membrane dope to form a solid membrane and dissolving the core. Other methods of making a reinforced hollow fiber membrane involve forming a reinforcing structure around the outside of a membrane wall acting as a core and bonding the reinforcing structure to the outside of the hollow fiber membrane. The membrane may have an internal or external separation layer, or a further separation layer may be applied over the reinforcing structure. Other methods of making reinforcing structures include spiral-wrapping filaments around a core and forming a non-woven fabric around the core, optionally on top of a set of longitudinal filaments. Corresponding membrane making devices and resulting membrane structures are also described.

DRAWINGS

DETAILED DESCRIPTION

In the description below, the longitudinal axis of the hollow fiber membrane being formed is vertical and a reinforcing structure is formed as it moves downwards. Filaments that are generally aligned with the length of the hollow fiber membrane may be called "warp" filaments. Filaments that are oriented at an angle to the warp filaments, and so extend around the circumference of the hollow fiber membrane or a part of it, may be called "wrap" filaments. These conventions and words are intended to simplify the detailed description that follows by providing a frame of reference, but are not intended to limit any claim.

The description below includes configurations for non-braided, reinforced hollow fibers with integral reinforcing filaments, optionally buried within the wall of the hollow fiber near the inside diameter or near the outside diameter, and some examples of methods and devices by which they may be constructed. The inside diameter of the reinforced hollow fiber can vary between 0.5 to 2.5 mm, or between 0.8 to 1.5 mm. The reinforced hollow fiber preferably has a thin wall, with a ratio of inside-to-outside diameters larger than 0.50.

A reinforced membrane may have some filaments that run in the axial or vertical direction generally continuously (warp filaments), or some that run along the circumference, at an angle relative to vertical greater than zero degrees or greater than 45 degrees (wrap filaments), or both. The number of generally parallel warp filaments may be such that the sum of their diameters divided by the inside circumference of the hollow fiber is in a range from 0.2 to 1.0, or between 0.5 and 0.8. Wrap filaments may be wound continuously in a helical pattern, or may be a plurality of discontinuous shorter filaments. The wrap filaments may protrude from one or more warp filaments of a composite yarn carrying the warp and wrap filaments, or the wrap filaments may be applied separately adjacent to and in contact with the warp filaments (if there are warp filaments). There can be one or several layers of wrap filaments. If there is more than one layer, the additional layer(s) may be immediately adjacent to and in contact with the first layer. Reinforcing filaments may be attached together at points where they cross each other by fusing or bonding, or by entanglement.

Warp and wrap filaments can be either monofilaments or multi-filaments or a mixture of both. They can be made from polymeric or natural fibers or yarns such as polyethylene, polypropylene, polyester, nylon, PVDF, etc. Filaments can be bi-component filaments, with an outer layer adapted for filament-to-filament bonding where filaments intersect. Bonding may be achieved by adapting one or more of a number of methods known in the art for bonding filaments of yarns in other applications, including heating, entangling, softening with a solvent or UV-activation.

Figure 1:
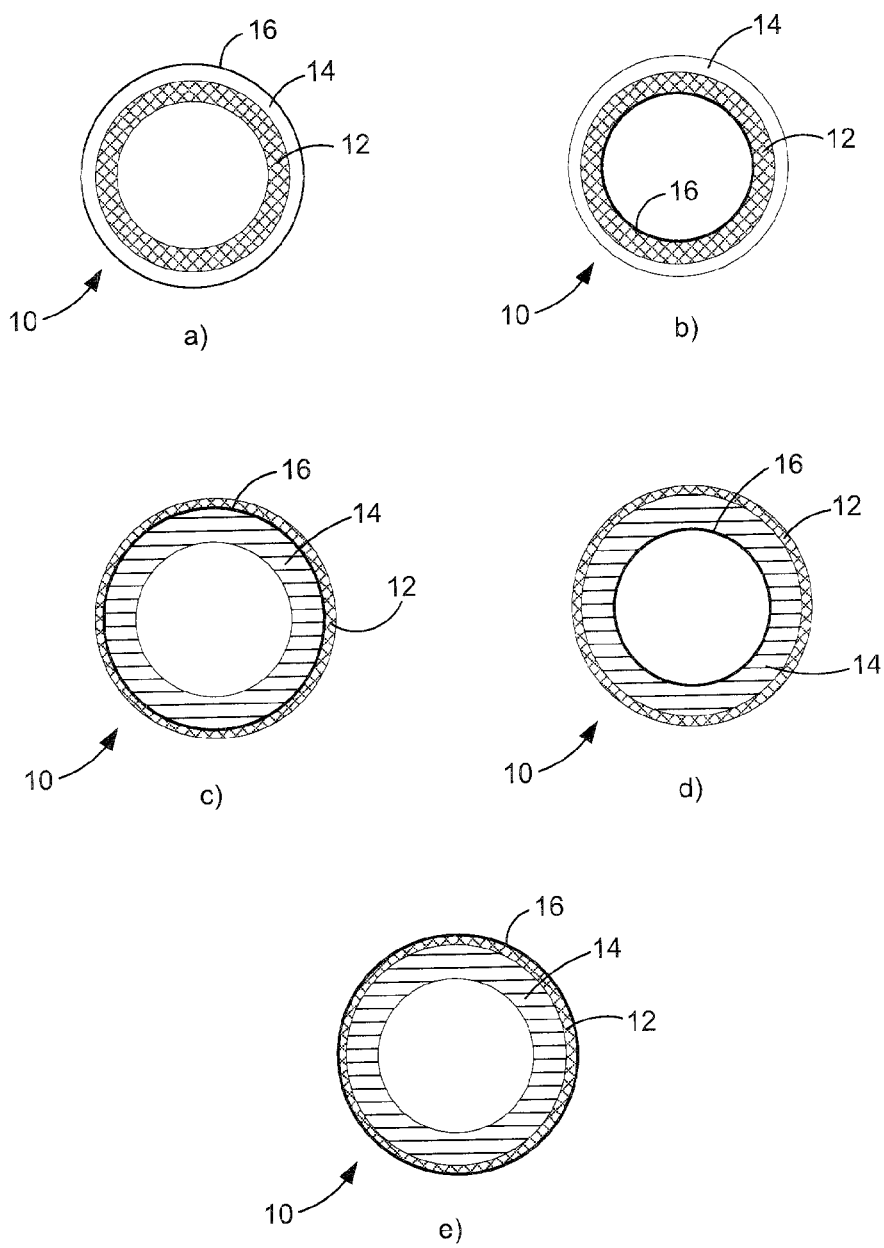
FIG. 1 shows cross sections of various hollow fiber membranes.

FIG. 1 shows various types of reinforced hollow fiber membranes 10. In one type of hollow fiber membrane 10, a reinforcing structure 12 is located near the inside diameter of the hollow fiber membrane. The reinforcing structure 12 is completely or partially embedded into a wall 14 of the hollow fiber membrane as illustrated in parts a) and b) of FIG. 1 for outside and inside separation layers 16, respectively. In this type of hollow fiber membrane 10, the reinforcing structure 12 is formed first and the wall 14 and separation layer 16 second.

In a second type of hollow fiber membrane 10, a reinforcing structure 12 is wrapped around a pre-made membrane wall 14 with a separation layer 16. This reinforcing structure is visible since it is only partially embedded into the pre-made hollow fiber membrane wall 14 or a separation layer 16, as illustrated in parts c) and d) for outside and inside separation layers 16, respectively. In this type of hollow fiber membrane 10, the membrane wall 14 and separation layer 16 are formed first and the cage 12 second.

In a third type of hollow fiber membrane 10, a cage or reinforcing structure 12 is wrapped around a supporting hollow fiber membrane wall 14 and is then coated with a separation layer 16 on the outside, as illustrated in part e) of FIG. 1.

Figure 2:
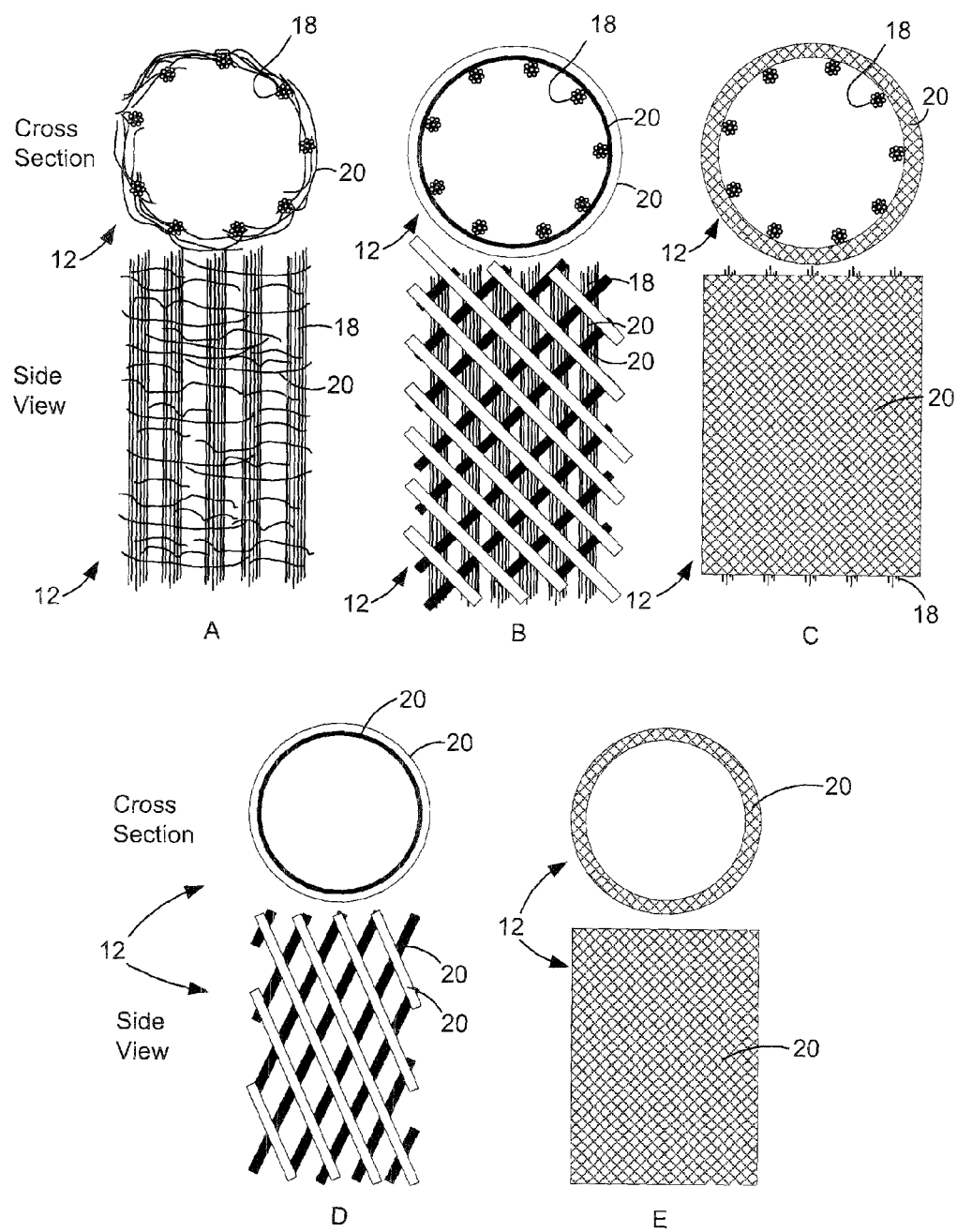
FIG. 2 shows side and cross-sectional views of various reinforcing structures.

Various forms of reinforcing structures 12 are illustrated in FIG. 2. Warp filaments, including sets or bundles of them, are indicated by reference numeral 18. Wrap filaments, including sets or bundles of them, are indicated by reference numeral 20. The forms of cage 12 will be described in greater detail below in combination with associated fabrication methods. The cage structure 12 is preferably cohesive but not necessarily independently round-stable before it is embedded completely or partially in the membrane polymer.

Five different fabrication methods are illustrated in FIGS. 3-7. In these methods, the cage structure 12, and the membrane wall 14 and separating layer 16, are formed in a series or sequence of operations resulting in the cage 12 being attached to or embedded in the membrane wall 14 near the inside diameter of the membrane 10. The reinforcing structures 12 are named according to the portion (A, B, C, D or E) of FIG. 2 that they are shown in. Additional fabrication methods that produce a cage 12 near the outside diameter of a membrane 10 will be described further below. Three of the reinforcing structures 12 (A, B and C) comprise warp filaments 18. In Cage A and the method of FIG. 3, wrap filaments 20 are provided by a fraction of composite yarns that also provide the warp filaments 18. In Cage B and the method of FIG. 4, the wrap filaments 20 are pre-formed and applied separately from the warp filaments 18. In Cage C and the method of FIG. 5, the wrap filaments 20 are applied separately but formed in-situ as a non-woven web. The other two reinforcing structures (D and E) are made without warp filaments. In Cage D and the method of FIG. 6, the wrap filaments 20 are pre-formed filaments. In Cage E and the method of FIG. 7, the wrap filaments 20 are provided by a non-woven web formed in-situ.

The fabrication methods for hollow fiber membranes 10 with the cage 12 near the inside diameter involve building the cage structure 12 around a core that will not be part of the finished membrane, for example a solid or hollow mandrel (optionally called a needle), or a dissolvable filament (solid or hollow) core. As will be described, in some cases the mandrel can be tapered or have portions with different diameters. If the core passes through the membrane coating head, the diameter of the core in the membrane coating head is substantially equal to the inside diameter of the desired hollow fiber membrane. An inlet to the bore at the top of a hollow mandrel may be open to atmosphere or attached to a source of pressurized gas or bore fluid. The reinforced hollow fiber 10 is preferably produced continuously in a machine where all the steps are done at the same linear speed called the spinning velocity. The spinning velocity may be between 10-40 m/min, or between 15-25 m/min.

Figure 3:
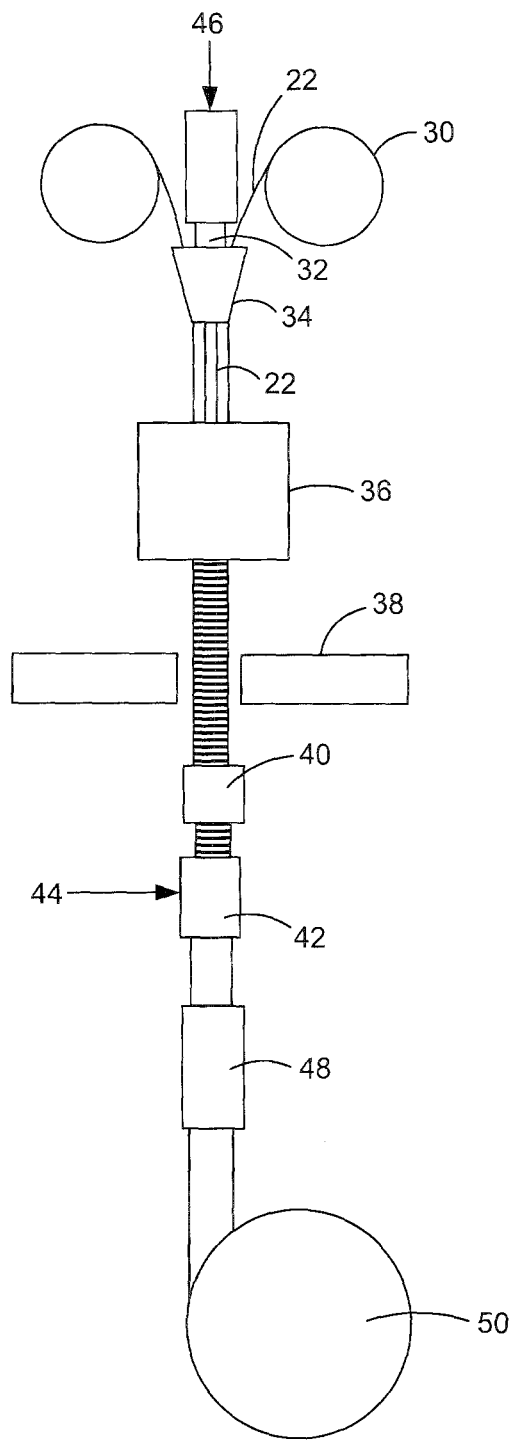
FIG. 3 is a schematic representation, in elevation view, of a machine for making a reinforced hollow fiber membrane according to structure A shown in FIG. 2.
Figure 11:
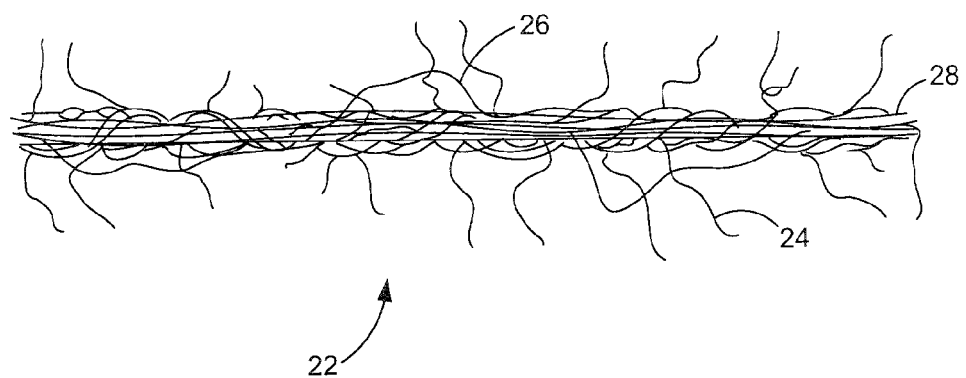
FIG. 11 is a schematic side view of a composite yarn.

Referring to FIG. 3, a method to make an example of Cage A is based on the use of a composite yarn 22. Referring to FIG. 11, composite yarns 22 have a "hairy" appearance, with a significant fraction of loose ends 24, or filament loops 26, or both, sticking out of a bundle of generally continuous filaments 28. For example, a composite yarn 22 may comprise long continuous filaments 28 mixed with shorter fibers providing loose ends 24 and loops 26. Such a yarn can be prepared, for example, by mixing a continuous filament yarn with a staple yarn or by stretch-breaking a fraction of the yarn as taught by Matsumoto et al in U.S. Pat. No. 5,497,608 and Takiue in U.S. Pat. No. 7,395,654.

In FIG. 3, there is a creel 30 to distribute a plurality of composite yarns 22 from bobbins arranged around a mandrel 32. The yarns 22 are pulled along the mandrel such that the continuous filaments 28 are positioned as warp filaments 18 as shown in part A of FIG. 2. The bobbins are stationary and there is one bobbin per yarn 22 with individual tension control. There may be, for example, between 3 and 12 composite yarns 22. The composite yarns are preferably distributed evenly around the mandrel 32 through a warp filament die 34. The warp filament die 34 is the only mechanical attachment point between the mandrel 32 and a supporting structure (not shown) for the mandrel and other components that will be described below, although the mandrel 32 is laterally supported by the other components that it passes through.

The composite yarns 22 pass along the mandrel 32 through a staple fiber wrapping device 36 whose purpose is to further orient the loose ends 24 or loops 26 along the circumference of the mandrel 32. At least a portion of the loose ends 24 or loops 26 are long enough to reach and contact the neighboring composite yarn 22 traveling along the mandrel 32. However, this portion of loose ends 24 or loops 28 does not need to initially protrude from the continuous filaments 28 by a distance that will reach a neighboring composite yarn 22 since the wrapping device 36 will move the ends 24 or loops 26 from their initial position. Loose ends 24 or loops 26 can be moved by adapting one of a number of yarn preparation methods know in the art such as air spinning or vacuum spinning. For example, in an air spinning method shown in U.S. Pat. No. 6,792,744, loose end filaments 24 are wrapped around a core of continuous filaments by passing a yarn through a die and using pressurized air jets to create a swirling flow pattern around the yarn. In a vacuum spinning method shown in U.S. Pat. No. 5,392,588, a yarn passes through a vacuum chamber that contains a perforated rotating mandrel. Air is drawn through the lumen of the mandrel where the yarn travels and exists through the mandrel perforations drawing loose filaments along. The fast rotation of the mandrel combs the loose fibers around the yarn. With a spinning device as described above, the loose ends 24 or loops 26 are preferably on average long enough to extend to or beyond the continuous filaments 28 of a neighboring composite yarn 22 traveling along the mandrel 32 such that the loose ends 24 or loops 26 of one composite yarn 22 will overlap or intersect with even those loose ends 24 or loops 26 of a neighboring composite yarn 22 that have similarly been moved.

Optionally, the number of composite yarns 22 and the extent that the free ends 24 or loops 26 initially protrude from the continuous filaments 28 can be made such that the free ends 24 or loops 26 span at least half of the centre to centre distance between adjacent composite yarns 22. In that case, the free ends 24 or loops 26 of adjacent composite yarns 22 reach and intersect with each other upon placement of the composite yarns 22 on the mandrel 32 and the wrapping device 36 may be removed. If the wrapping device 36 will not be used, then the composite yarns 22 are preferably selected or specified to be somewhat bulky, with a large enough fraction of wrap filaments 24, 26 so that the wrap filaments 24, 26 will tend to fill the space between adjacent composite yarns 22 even if they are compressed momentarily as they pass through the warp filament die 34, to provide a large number of intersections with wrap filaments 24, 26 from adjacent yarns, and to help keep adjacent composite yarns 22 at an even spacing around the mandrel 32. Suitable composite yarns 22 include, for example, chenille and air covered and air textured yarns. In chenille yarns, for example, a twisted core provides the continuous filaments 28 and the pile provides loose ends 24. In chenille yarns in particular, the pile is advantageously biased to protrude outwards from the core, and so to extend around the circumference of the mandrel, although some of the pile also initially protrudes away from the mandrel 32 until pulled back into the area to be occupied by the membrane wall in a smoothing die 40 or coating head 42, both to be described below.

For example, with a 1.25 mm outside diameter mandrel 32 used to make a 1.9 mm outside diameter reinforced hollow fiber membrane, a cage structure 12 may have a desired outside diameter of 1.5 mm. The outer circumference of the cage structure 12 is about 5 mm. Three chenille yarns 22 having pile filaments 24 about 4 mm in length and 15 to 20 micron in diameter can be laid on the mandrel 32 with the pile filaments overlapping each other without a wrapping device 36. The warp filament die 34 may be configured to apply the chenille yarns 22 to the mandrel 32 sequentially so that the pile filaments (loose ends 24) overlap each other. Optionally, loose ends 24 or loops 26 may be ruffled with air jets to encourage entanglement with overlapping or intersecting loose ends 24 or loops 26 from adjacent composite yarns 22.

Going down along the mandrel 32, there is an optional filament bonding device 38. Filament entanglement (for example entanglement of the loose ends 24 or loops 26 of one composite yarn 22 with the loose ends 24 or loops 26 of another composite yarn 22) may be enough to stabilize the cage structure 12. However, it is also possible to bond some or all of the filaments 24, 26, 28 to each other by heating, applying UV light, etc at points of contact where they intersect. For example, heat can be applied to soften the sheath portion of bi-component filaments. Bi-component filaments are available, for example, from FIT Fibers with a polyester core (PET) with a melting point >250° C. and a sheath made from copolymers with melting points ranging between 110-180° C. Alternatively, the bonding step can be performed during application of the membrane dope if the dope solvent has the ability to soften the filament polymer or coating and promote bonding.

The cage assembly 12 optionally passes through a smoothing die 40 to apply pressure while the polymer is still soft in order to promote bonding. A die 40 may also be used to adjust the outside diameter of the cage 12 to its desired dimension or to pull any filaments that may protrude excessively from the cage 12 back into the desired outside diameter. Hot air may be blown through the smoothing die 40, or upstream of the smoothing die 40, to help with setting the filaments into the desired outside diameter of the cage 12 if there is no upstream heated bonding step.

Going down along the mandrel 32, there is an optional cooling step (not shown) before the cage structure enters a dope coating head or spinneret 42. In the coating head 42, liquid membrane dope 44 is applied to the yarns 22. Optionally, the yarns 22 are fully impregnated with membrane dope 44 in the coating head 42 by injecting enough polymer dope 44 to fill the gap between the mandrel 32 and the coating head 42 button (smallest inside) diameter. The diameter of the mandrel 32 can be reduced in the area of the coating head 42 to further assist in having the polymer dope 44 fully impregnate the filament reinforcing structure 12 so that no filament is exposed to the hollow fiber lumen.

The mandrel 32 may end just as the formed reinforced hollow fiber exits the coating head 42. A gas drawn through a bore of the mandrel 32 may prevent fiber collapse. Alternatively, a bore fluid 46 can be injected through the mandrel 32 to control the asymmetry of the polymeric cross-section near the inside surface. Typically the bore fluid 44 is a mixture of solvent and non-solvent toward the membrane polymer.

The following membrane forming steps are similar to those used to make non-reinforced or braid coated hollow fibers. These steps vary according to the polymer coagulation method (NIPS or TIPS), and the desired membrane properties. These conditions have been broadly described in the prior art and typically include the steps of initial membrane formation through an air gap, coagulation, rinsing, post-treatment (e.g., chlorination), impregnation (e.g., with glycerine), bundling and drying. In FIG. 3, these steps are indicated schematically as occurring in a membrane formation area 48, although various separate items of equipment may be used. These devices can all be in-line, or they may be separated by taking up the hollow fiber onto a bobbin or a winder in between them. The overall speed of the method, or spinning velocity, is controlled by the speed of the first device to take up the hollow fiber membrane after the coating head 42. Upstream devices that apply or move the wrap filaments 20, such as the spinning machine 36, are controlled to operate at a speed appropriate for the spinning velocity and may be coupled either mechanically or electronically to the first take up device or its controller. The finished hollow fiber membrane is typically wound on a spool 50 for transfer to a module manufacturing area.

Figure 4:
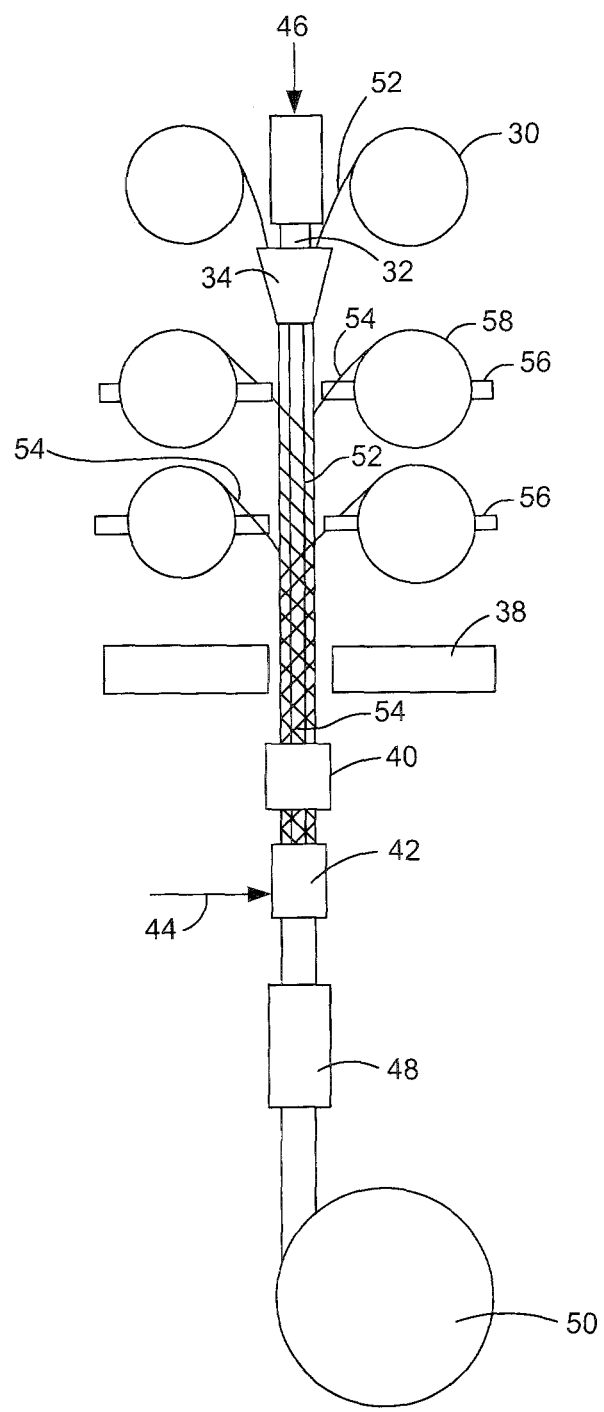
FIG. 4 is a schematic representation, in elevation view, of a machine for making a reinforced hollow fiber membrane according to structure B shown in FIG. 2.

Referring to FIG. 4, a method to build Cage 13 is similar to the method to build Cage A described above in some respects (indicated by the use of the same reference numerals), but differs at least in the source of the wrap filaments 20. The features that are different will be described below.

A warp yarn 52 may be a conventional yarn with continuous filaments, preferably bi-component filaments, for example as described above. Generally continuous wrap filaments 54 are applied using one or more rotating creels 56 that rotate around the mandrel 32 (as shown in FIG. 4) or by wrap spinning machines where the bobbin axis coincides with the mandrel 32 as described in the method to make Cage D and shown in FIG. 6.

When using a rotating creel 56, wrap filament bobbins 58 are mounted on a wheel that rotates around the needle without being in contact with it, and always in the same direction. Each wrap bobbin 58 is equipped with tension control. One or more rotating creels 56 can be used, rotating in alternate directions (two shown in FIG. 4). The wrap filament pitch is related to vertical velocity and winding speed by Equation 1 below wherein P is the pitch (mm), meaning the vertical distance corresponding to a complete turn, V is the vertical velocity (m/min) and W is the winding speed (rpm)

$$P = \frac{V \times 1000}{W} \quad \text{Equation 1}$$

For example, for a winding speed of 4,000 rpm and a vertical velocity of 16 m/min, the pitch would be 4.0 mm. If the rotating creel 56 contains 4 bobbins 58, the distance between parallel wrap filaments 20 would be 1.0 mm. With the two rotating creels 56 shown in FIG. 4, a diamond pattern of wrap fibers 20 is obtained, as shown in FIG. 2, Part B.

Figure 5:
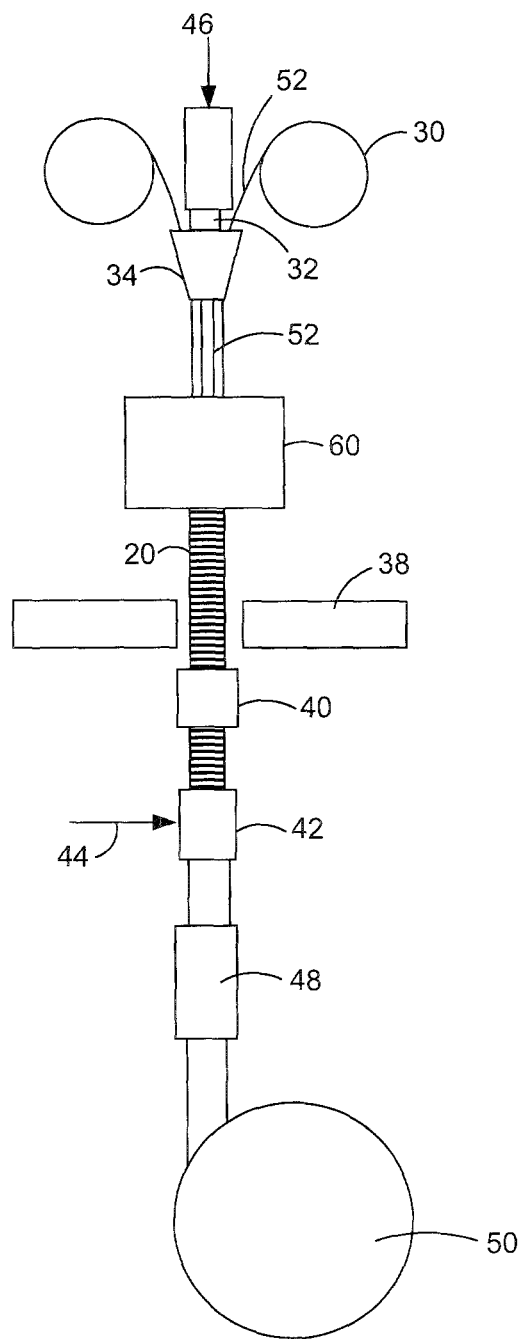
FIG. 5 is a schematic representation, in elevation view, of a machine for making a reinforced hollow fiber membrane according to structure C shown in FIG. 2.

Referring to FIG. 5, a method to fabricate a non-braided reinforced hollow fiber membrane with an example of Cage C is similar to the method described above except that the rotating creels for wrap filaments are replaced by a non-woven web forming device 60 to form filaments in-situ, as will be described below.

In this method, wrap filaments 20 are produced in-situ by melt-extrusion, dry spinning or electro-spinning. These methods are known in the art for other applications as described in U.S. Pat. Nos. 3,849,241; 4,689,186; 4,965,110; 5,271,883; and, 6,114,017. Typically, thermoplastic polymers are extruded at high temperature through small orifices using air to elongate the filaments and transport them to a moving collector, which in this case is the warp filaments 52 moving down the mandrel 32. Process conditions for the spunbond and meltblown processes are described in the following Table 1. Polymer flow per hole can be up to 1-2 g/min.

TABLE 1

| Process | Filament diameter (Micron) | Elongation Factor | Die Hole Diameter (Micron) |
| --- | --- | --- | --- |
| Spunbond | 20-80 | 20-40 | 1000-2000 |
| Meltblown | 2-6 | 100-200 | 400-1000 |

In the web forming device 60, extrusion die assemblies are located around the mandrel 32 along which travels the warp filaments 52. Each extrusion die assembly has a molten (for melt spinning) or dissolved (for dry spinning) port and extrusion holes, as well as high pressure air port and air jet holes located around the polymer extrusion hole. The turbulent air flow around the die causes warp fibers 20 to deposit randomly on surface of the warp yarn 52. Air flow can be pulsed to improve filament distribution. As an alternative, each extrusion die assembly is mounted in a way that allows rapid vibration in the horizontal plane. Vibration at a frequency of 50 to 200 Hertz can be effected by a number of means known in the art. An optional variation of this method is to rotate the extrusion dies around the mandrel 32.

If electro spinning is used, the mandrel 32 can be used as an electrode and the electric field can be varied as taught in U.S. Pat. No. 4,689,186 and U.S. Pat. No. 4,965,110 to promote an even distribution of wrap filaments 20 around the mandrel 32.

Given the conditions described above, it can be calculated that a typical elongated filament of 50 Micron extruded at a polymer flow rate of 2 g/min would come out at a velocity of about 16 m/s. This velocity is 2 orders of magnitude larger than the spinning velocity, which means that the wrap filaments 20 can be deposited on the travelling warp filaments at a small negative angle to the horizontal. The resulting structure of the wrap filaments 20 is a random non-woven web.

For example, wrap filaments 20 may occupy an annular space with an inside diameter of 1.2 mm and an outside diameter of 1.3 mm in a membrane wall 14 at a 50% porosity. With a polymer density of 1 g/ml, the mass of wrap filaments per m of hollow fiber is 0.098 g/m. Assuming a spinning velocity of 15 m/min, the mass flow rate of wrap filament is (0.098×15) or 1.47 g/min. With four extrusion dies, the mass flow rate per die is 0.37 g/min. A number of mandrels 32 can be positioned side-by-side, close to each other, in order to maximize extruded fiber capture.

As an alternative to in-situ fiber extrusion, chopped fibers can be distributed around the mandrel 32 in the web forming device 60 using air entrainment to form a non-woven web that is then consolidated using heat and pressure through a die. Since even distribution of pre-chopped fibers can be difficult, an alternative is to withdraw continuous filaments from fixed bobbins around the mandrel 32 and chop them in-situ with a rotating knife located in an enclosure around the mandrel 32. This method allows precise delivery of fibers (length and number) around the mandrel 32. The filaments can be fed into the rotating knife enclosure with an air venturi and the air flow can be used to pack the chopped fibers around the mandrel 32 as the air travels to escape through the bottom portion of the enclosure.

Figure 6:
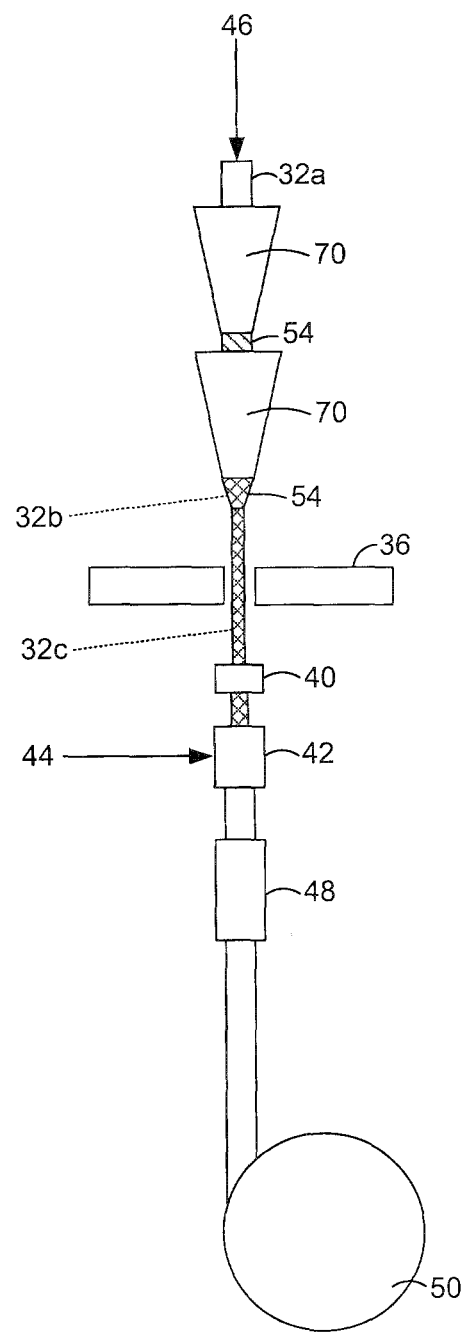
FIG. 6 is a schematic representation, in elevation view, of a machine for making a reinforced hollow fiber membrane according to structure D shown in FIG. 2.

FIG. 6 shows a method to make a reinforcing structure according to Cage D. This method is similar to the method described in relation to FIG. 4 but there are no warp yarns 52 and wrap spinning machines 70 are used to apply the wrap yarns 54. Wrap spinning machines 70 apply very little tension to the mandrel 32. However, the tension applied to the finished hollow fiber membrane 10 causes the wrap filaments 20 to change their orientation (increasing the pitch) as they travel down the mandrel 32 before they are bonded together, which may cause the warp filaments 20 to seize on the mandrel 32. The reinforcing cage structure 12 is built around a tapered mandrel 32 in order to prevent the wrapping filaments 20 from seizing on the mandrel 32. In an area 32a above the wrap spinning machines 70, the mandrel 32 has a diameter D1. In a lower area 32c, where the mandrel 32 passes through the bonding device 38, smoothing die 40 and coating head 42, the mandrel has a diameter D2. D1 is larger than D2. A transition area 32b between D1 and D2 can be gradual or follow one or more sudden changes.

The wrap filaments 20 may be wrapped using wrap spinning machines 70, for example as modified from wrap spinning machines used in for other applications. Examples of wrap spinning machines are described in U.S. Pat. Nos. 4,299,083 and 5,303,550. Wrap spinning is typically used to prepare elastic yarn by wrapping a core yarn (elastic) with a wrapping yarn (non elastic). In the present application, a wrap spinning machine 70 is centered on the mandrel 32 and used to wrap the mandrel 32 with the wrap yarn 54. Because wrap spinning machines 70 are rotating around their axis, winding velocities as high as 50,000 rpm can be reached, as taught by Setzer in U.S. Pat. No. 5,303,550.

Figure 7:
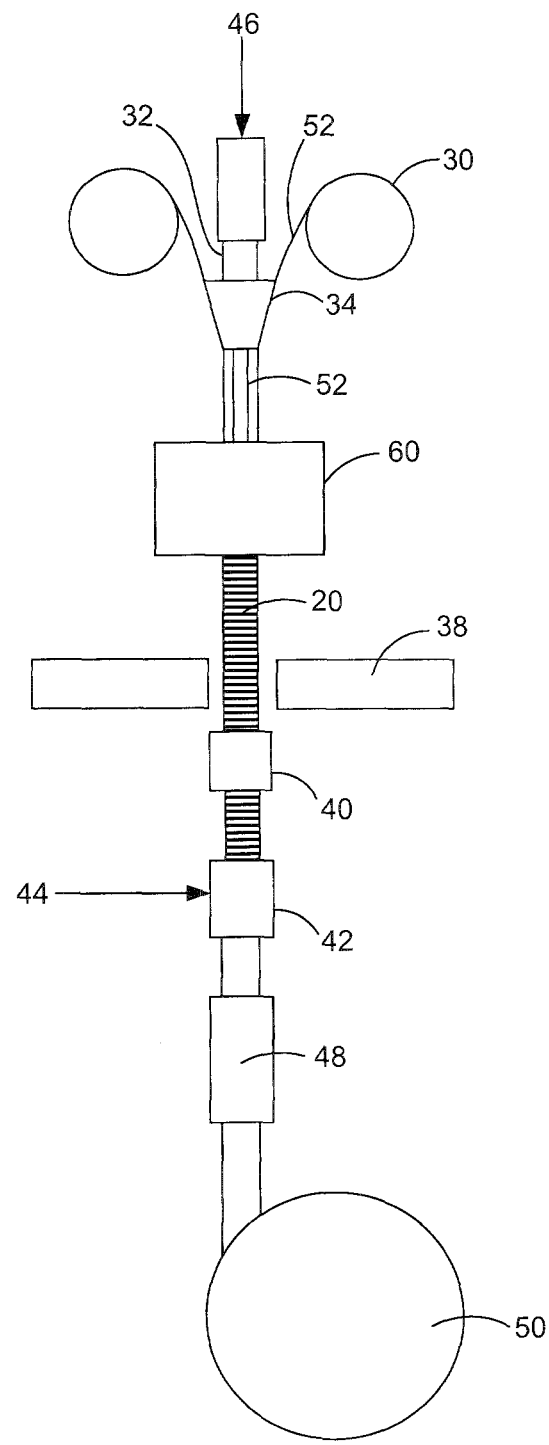
FIG. 7 is a schematic representation, in elevation view, of a machine for making a reinforced hollow fiber membrane according to structure E shown in FIG. 2.

Referring to FIG. 7, a non-woven tube of wrap filaments 20 is formed in-situ as described in relation to FIG. 5 but without warp filaments 18. This approach is possible if the non-woven web is cohesive and strong enough to be pulled off the mandrel 32. A certain amount of stretching (and diameter reduction) is desirable.

An alternative method related to all of the methods described above is to form the cage structure 12 around a completely or partly dissolvable core instead of a mandrel 32. For example, the core can be a solid or capillary tube that can be later dissolved in a solvent, preferably the solvent used to coagulate the membrane (typically water). Examples of water-soluble polymers include PVA, EVOH (made by Kuraray), as well as some forms of polyester (available from Eastman) and nylon (available from Shakespeare).

An alternative to the methods described above for making examples of cages B and D involves forming the tubular cage structure 12 around a very light weight capillary tube made of a thin non-woven. This tube can be fabricated by pulling in a ribbon of non-woven fabric parallel to the axis of the mandrel 32, curling the fabric it into circular shape with a guiding die and forming an overlapping seam tube. The tube can then be wrapped with the wrap filaments 20 with or without first bonding the non-woven fabric seam.

If the methods described above are used in a way that results in a rigid but thin walled cylindrical cage 12 before membrane impregnation, the membrane dope 44 may be applied below the end of the mandrel 32 so that there is a gap between the end of the mandrel 32 and the coating head 42. In this case, a solid mandrel 32 or wire can be used since pressure equilibration can be effected in a gap between the mandrel 32 and the coating head 42 where ambient air is sucked into the lumen of the forming hollow fiber to prevent collapse. In this case, the subsequent membrane impregnation step is done by delivering the dope 44 at a precise flow rate to avoid filling the lumen, which is now open rather than filled by the mandrel 32, with dope 44. A positive displacement pump can be used for that purpose. This operation can be made easier if the membrane dope spontaneously wets the reinforcing filaments 18, 20 so that it is retained by surface tension within the cage structure 12. This can be achieved by treating the surface of the filaments or manipulating the composition of the dope, or both. If the cage structure 12 is round stable, it can be taken up on a bobbin for further processing in a later coating step as is typically done with a braided support. However, the alternatives in this paragraph are not preferred since it is preferable to form the thinnest reinforcing structure 12 that will provide the desired strength and to form the membrane in line with the membrane formation steps.

Figure 8:
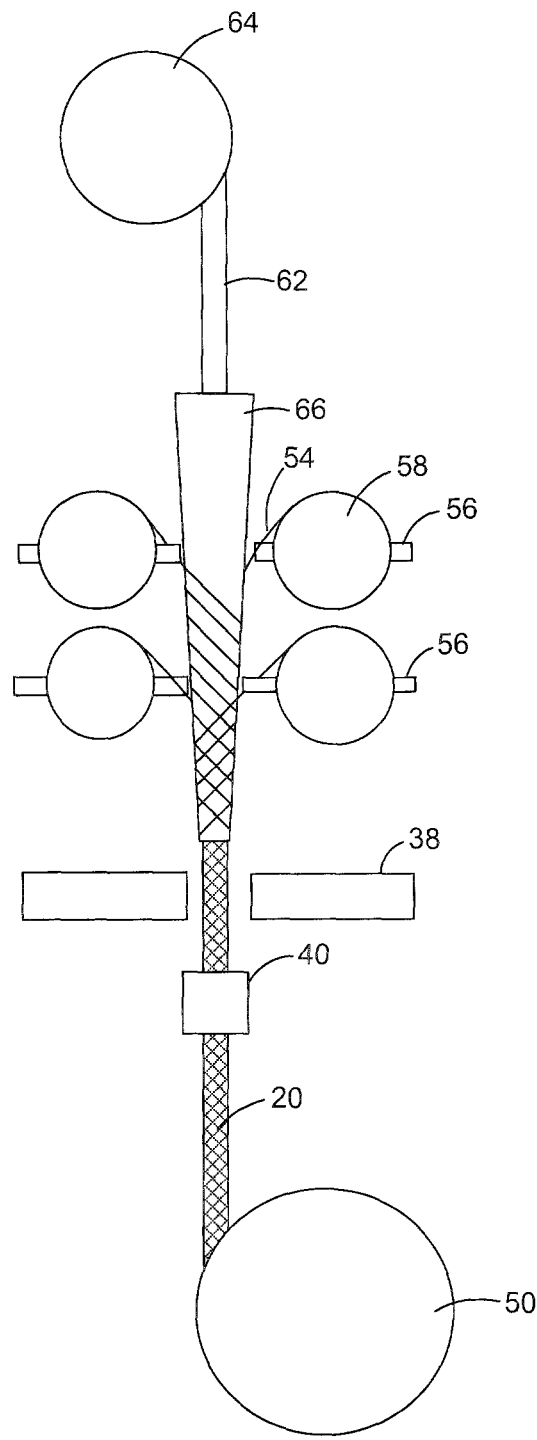
FIGS. 8, 9 and 10 are schematic representations, in elevation view, of other machines for making a reinforced hollow fiber membrane according to structure D shown in FIG. 2 over a moving core.
Figure 9:
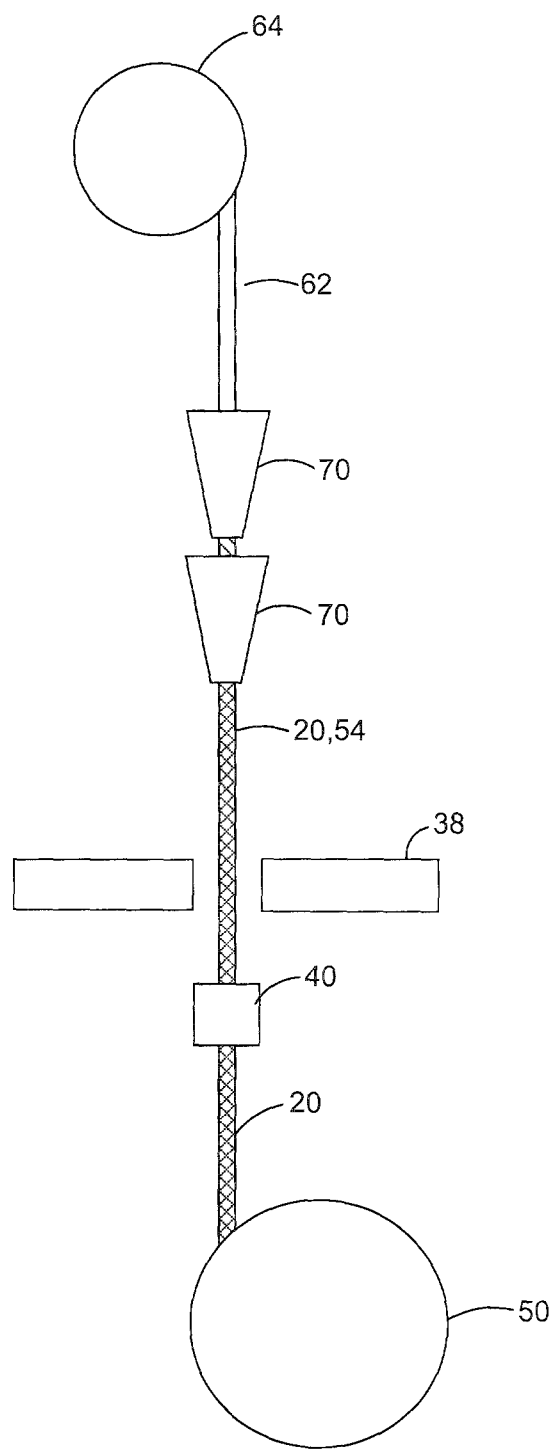
Figure 10:
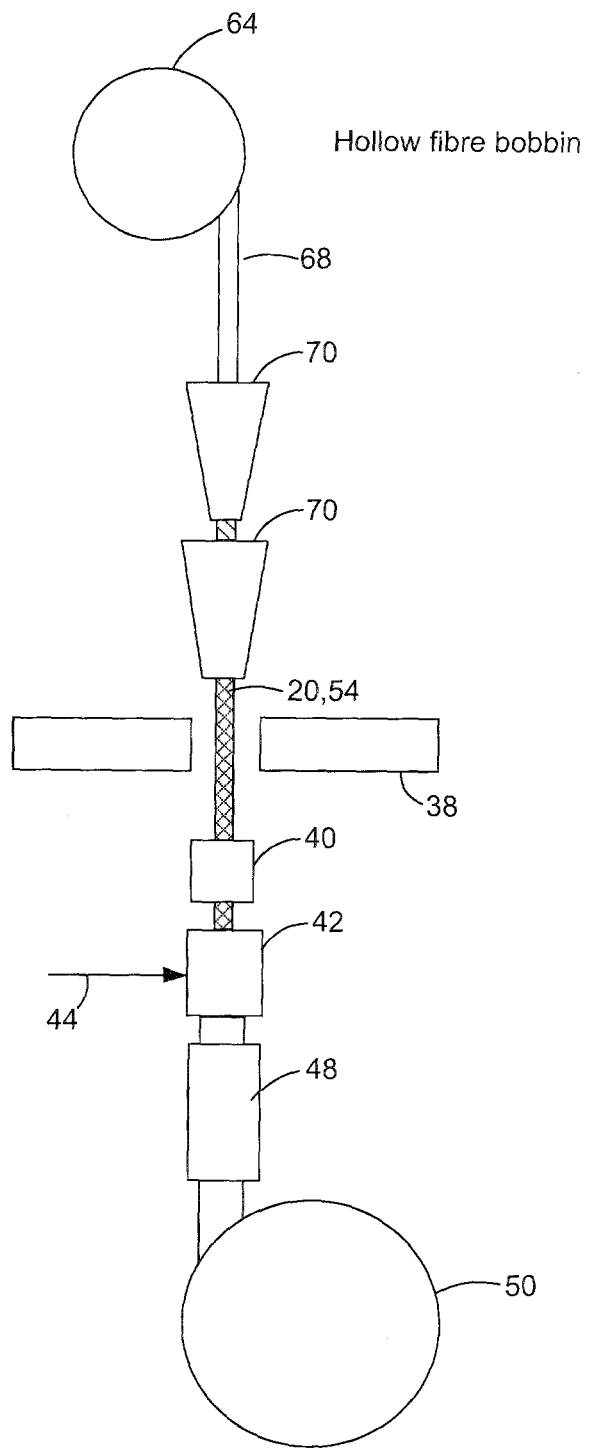

Fabrication methods for producing a hollow fiber membrane 10 with the cage 12 near the outside diameter of the membrane wall 14 involve building the cage structure 12 around a pre-made hollow fiber. In this case, the cage 12 is built around a finished (with separation layer 16) or supporting (without separation layer 16) hollow fiber membrane wall 14 as an additional step, at a speed only limited by any wrapping equipment. Three different fabrication methods are illustrated in FIGS. 8-10 to describe various ways of forming the cage structure. In FIGS. 8 and 9, a supporting structure 12 according to cage D is formed around a finished hollow fiber membrane wall 14 using a mandrel 32 and directly onto the finished hollow fiber membrane wall 14. In FIG. 10, a supporting structure 12 according to cage D is formed around a supporting hollow fiber membrane and over coated with a separating layer 16.

Referring to FIG. 8, a reinforcement structure 12 according to Cage D is built around a finished hollow fiber membrane 62. The hollow fiber membrane 62 is fed from a hollow fiber bobbin 64 to the wrapping device 56 inside a tapered mandrel 66. The wrapping filaments 20, 54 are wrapped around the mandrel 66 and pulled down to wrap the hollow fiber membrane 62 as it comes out of the mandrel 66. In FIG. 8, the mandrel 66 does not extend past the wrapping device 56. The wrapping equipment can be rotating creels 56 (shown) or wrap spinning machines (not shown) as described above. After wrapping, the wrap filaments 20 are subjected to the filament bonding and smoothing die steps before the reinforced hollow fiber membrane is taken up on a spool 50.

In this reinforcement structure, the wrap filaments 20 will be visible on the outside surface of the hollow fiber. For I/O hollow fibers with a separation layer on the lumen side, the wrap filaments 20 provide the added benefit of bulking up the bundle to facilitate potting during module fabrication and providing better access to all of the membrane surface during operation (i.e. improving backwashing). For O/I fibers, the reinforcement 18, 20 filaments will block a small fraction of the separating layer 16, but will provide the benefits of protecting the separation layer from abrasion, expanding the bundle to improve operation and disrupting the hydraulic boundary layer, acting like a feed spacer in a spiral-wound module.

The method shown in FIG. 9 is similar to that described in FIG. 8 except that the cage structure 12 is built directly around the hollow fiber 62. This can only be done with wrap spinning machines 70 that exert very little tension on the travelling hollow fiber 62.

The method illustrated in FIG. 10 is similar to those described in FIGS. 8 and 9, except that the feed hollow fiber 68 is a microporous support. This hollow fiber support 68 has a thin wall (for example smaller than 15% of the outside diameter) and could not be used by itself for filtration without collapsing, bursting or collapsing. It is also selected to have large pores (for example greater than 0.2 Micron) in order to minimize resistance to flow. The hollow fiber support 68 is wrapped with reinforcing filaments 20, 54 and then over-coated with a separation membrane as has been described above.

The invention claimed is:

1. A method of making a reinforced hollow fiber membrane comprising the steps of:
   a) providing a core, the core having a length and a circumference perpendicular to the length;
   b) providing a plurality of composite yarns, wherein each of the composite yarns comprises a first part and a second part, the first part comprising one or more generally continuous filaments extending along the length of the composite yarn, the second part comprising a plurality of filaments ends or loops protruding from the first part of the composite yarn;
   c) forming a reinforcing structure around the core wherein the first parts of the plurality of composite yarns are spaced around the circumference of the core and generally aligned with the length of the core, and the second parts of the plurality of composite yarns extend around a portion of the circumference of the core and intersect with one or more filaments of one or more others of the plurality of composite yarns;

d) applying a liquid membrane dope to the reinforcing structure; and, e) treating the liquid membrane dope to form a solid membrane.

2. The method of claim 1 wherein the second parts of the plurality of yarns are oriented along the circumference of the core after the first parts of the plurality of yarns are spaced around the circumference of the core.

3. The method of claim 1 wherein the center to center distance around the core between adjacent composite yarns and the distance by which the second parts protrude from the first parts of the composite yarns is such that the second parts of adjacent composite yarns overlap each other upon placing the composite yarns on the core.

4. The method of claim 1, wherein the core is a mandrel and the yarns move along the length of the mandrel during step c) and further comprising a step of removing the plurality of yarns from the mandrel.

5. The method of claim 4 wherein the mandrel comprises one or more sections, each section having a generally cylindrical or generally conical outer surface.

6. The method of claim 4, wherein the mandrel has an interior bore, and further comprising a step of passing a bore fluid through the interior bore of the mandrel.

7. The method of claim 4, wherein step d) comprises impregnating the plurality of yarns with the liquid membrane dope.

8. The method of claim 1, wherein step c) comprises air spinning or vacuum spinning the second parts of the plurality of yarns.

9. The method of claim 1, further comprising a step of bonding the second parts of the plurality of yarns to each other or to the first parts of the plurality of yarns at points of contact where they intersect after step c).

10. The method of claim 9 wherein the step of bonding comprises applying heat or UV light.

11. The method of claim 10 wherein the step of bonding comprises solvent bonding.

12. The method of claim 9, wherein the plurality of yarns comprise bi-component filaments, the bi-component filaments comprising a portion adapted to be bonded to other filaments of the plurality of yarns.

13. The method of claim 1, further comprising a step of smoothing the plurality of yarns before step d).

14. The method of claim 1, wherein the yarns are made by stretch-breaking a fraction of a composite yarn.

15. The method of claim 1, wherein the core is a hollow fiber membrane and the reinforcing structure is maintained around the core.

16. The method of claim 1, wherein the core is soluble in a solvent that does not dissolve the solid membrane.

17. A method of making a reinforced hollow fiber membrane comprising the steps of:

a) forming an arrangement of filaments over a mandrel, the step of forming comprising steps of arranging continuous filaments of composite yarns along the length of the mandrel and filament ends or loops of the composite yarns protruding from the continuous filaments of adjacent composite yarns intersecting each other;

b) pulling the arrangement of filaments through a coating head;

c) flowing a membrane dope through the coating head and around the arrangement of reinforcing filaments;

d) removing the reinforcing filaments from the mandrel; and e) treating the membrane dope to form a solid membrane wall supported by the arrangement of filaments.

18. The method of claim 17 wherein step a) comprises passing the composite yarns along the mandrel and moving the filament ends or loops to span between two or more of the adjacent composite yarns.

19. A method of making a reinforced hollow fiber membrane comprising the steps of:

a) providing a moving fiber core;

b) forming a reinforcing structure around the outside of the core;

c) coating the reinforcing structure with a liquid membrane dope;

d) treating the liquid membrane dope to form a solid membrane, wherein the plurality of yarns are at least partially embedded in the solid membrane; and, e) dissolving the core.

20. A method of making a reinforced hollow fiber membrane comprising the steps of:

a) providing a moving hollow fiber membrane;

b) forming a nonbraided reinforcing structure comprising a plurality of intersecting filaments around the outside of the hollow fiber membrane;

c) bonding the filaments of the reinforcing structure at points of contact where they intersect to maintain the reinforcing structure around the hollow fiber membrane to form the reinforced hollow fiber membrane comprising the reinforcing structure and the moving hollow fiber membrane of step a).

21. The method of claim 20 further comprising coating a separation layer over the reinforcing structure.

22. A method of making a hollow fiber membrane comprising the steps of:

a) passing a hollow fiber membrane through a hollow mandrel;

b) forming an arrangement of filaments over the mandrel while pulling one end of the arrangement of filaments from the mandrel onto the hollow fiber;

c) bonding the filaments to each other or to the hollow fiber membrane; and d) coating a membrane dope over the filaments and the hollow fiber membrane; treating the liquid membrane dope to form a solid membrane.

23. The method of claim 22 wherein step (b) comprises the steps of:

i) wrapping a first filament around a mandrel while pulling one end of the first filament from the mandrel; and, ii) wrapping a second filament around the mandrel and over the first filament while pulling one end of the second filaments from the mandrel.

24. The method of claim 22 wherein the filaments are maintained around the hollow fiber membrane after step d).

25. The method of claim 22 wherein the hollow fiber membrane is nonporous but soluble or partly soluble.

26. A method of making a hollow fiber membrane comprising the steps of:

a) passing a tube or hollow fiber towards and through a coating head;

b) forming an arrangement of filaments over the tube or hollow fiber as it passes towards the coating head;

c) coating a membrane dope over the tube or hollow fiber and filaments in the coating head; and forming a solid membrane; and d) removing the tube or hollow fiber from the arrangement of filaments.

27. The method of claim 26 further comprising a step of bonding the filaments to each other at points of contact where they intersect as the tube or hollow fiber passes towards the coating head.

* * * * *